N. M. RICHARDSON.
COMBINED DISH WASHER AND HOLDER.
APPLICATION FILED JULY 27, 1910.
973,212.
Patented Oct. 18, 1910.
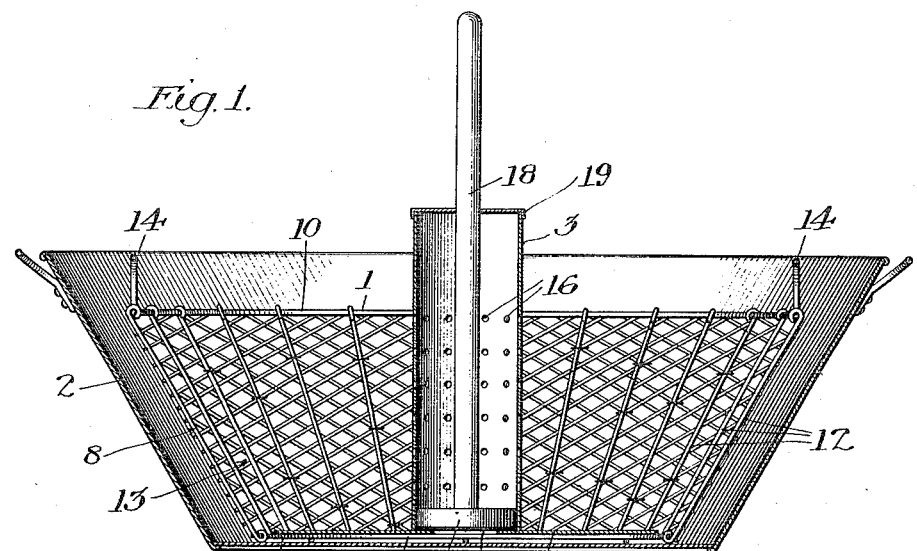
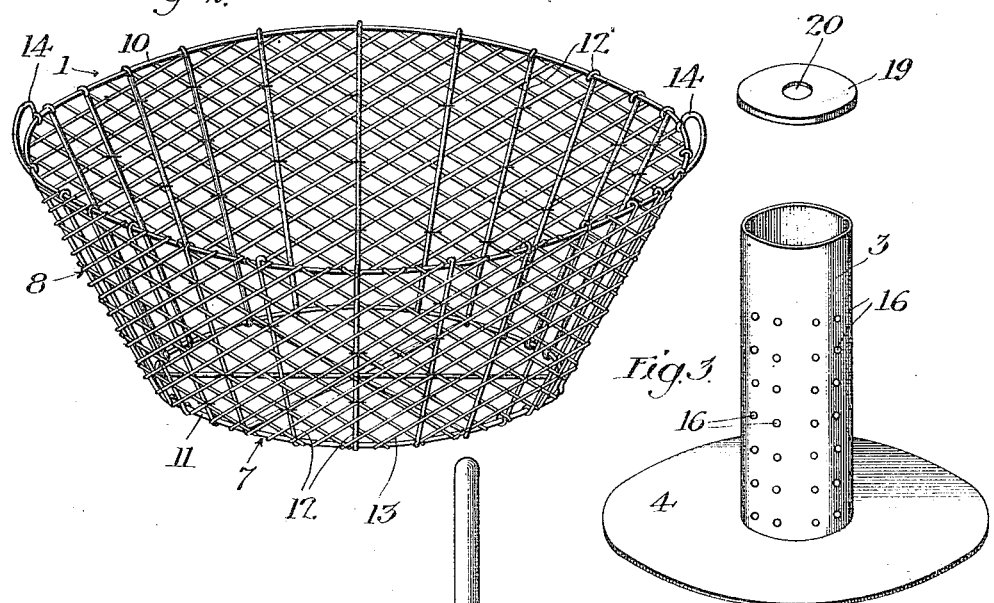
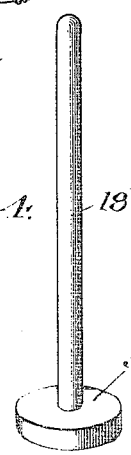
Inventor:
Nancy M. Richardson

UNITED STATES PATENT OFFICE.

NANCY M. RICHARDSON, OF LOS ANGELES, CALIFORNIA.

COMBINED DISH WASHER AND HOLDER.

973,212.   Specification of Letters Patent.   Patented Oct. 18, 1910.

Application filed July 27, 1910. Serial No. 574,178.

*To all whom it may concern:*

Be it known that I, NANCY M. RICHARDSON, a citizen of the United States, residing at Los Angeles, in the county of Los Angeles and State of California, have invented a new and useful Combined Dish Washer and Holder, of which the following is a specification.

The main object of the present invention is to provide means whereby dishes can be quickly and conveniently washed with a minimum of handling of the dishes and hot water.

Another object of the invention is to provide a means for holding the dishes while they are being inserted in the water and washed and while they are being rinsed and drained.

Other objects of the invention will appear hereinafter.

The accompanying drawings illustrate the invention, and referring thereto:—

Figure 1 is a vertical section of the device in place in the dish pan. Fig. 2 is a perspective of the dish holder. Fig. 3 is a perspective of a central cylinder used for distributing or circulating the water and mixing the soap therewith, the cap for said cylinder being shown as separated therefrom. Fig. 4 is a perspective of the plunger for operation in said cylinder.

The invention comprises a holder or basket 1 adapted to be placed in an ordinary dish pan indicated at 2, a cylinder 3 having a base plate 4 adapted to rest on the bottom of said holder or basket, and a plunger 5 adapted to work in said cylinder.

The holder or basket 1 may be made of wire with bottom 7 and side portion 8, the said basket being preferably frusto-conical with its side portion flaring upwardly to conform more or less to the shape of the dish pan 2 and the bottom and side portion of said holder or basket being of open-work or perforate to allow free passage of water therethrough. For this purpose the basket 1 may be made with upper and lower rings 10 and 11 connected by side bars 12, wire netting, indicated at 13, being stretched across the bottom and around the side portion of the basket. Handles 14 may be provided for the basket whereby it may be conveniently deposited in and removed from the dish pan 2.

The cylinder 3, which may be of sheet metal, is secured at its lower end to the bottom plate 4 which is disk-shaped to correspond with the bottom 7 of the holder 1, said bottom plate extending inwardly at the bottom of the cylinder and having an opening 15 for passage of water from the lower part of the cylinder on the bottom plate 4 and the side wall of the cylinder is perforated as at 16 for passage of water from the cylinder into the surrounding body of fluid, and vice versa.

The plunger 5 is adapted to move with a sliding fit in the interior of the cylinder 3 and is provided with a handle 18 extending vertically some distance above the top of the cylinder 3, said cylinder having a closure cap 19 at the top provided with a central opening 20 for the passage of said handle.

The device is used as follows: The holder or basket 1 being placed on a suitable support and the cylinder 3 being placed in position therein, the dishes are deposited in the holder around the cylinder 3 and the holder is then lowered into the dish pan 2, water being placed in the pan before or after the holder with the dishes is placed therein, and soap being placed in the cylinder 3, or elsewhere in the pan as may be desired. By then working the plunger 5 up and down, the water is circulated back and forth between the cylinder and the surrounding portion of the fluid and between the lower part of the cylinder and the bottom part of the pan, so that thorough circulation and agitation of the water in contact with the dishes and the soap is effected. The bars 12 of the holder being bent around the lower ring 11, support the bottom of the holder above the bottom of the dish pan so as to allow free movement of water between said parts. When the dishes have been cleaned by this means, the holder may be removed from the dish pan and the dishes rinsed by pouring water thereover and the dishes may then be allowed to drain while still supported in the holder, the same holder serving for washing, rinsing and draining, with only one handling of the dishes in placing them into the holder and one handling in removing them from the holder.

What I claim is:—

The combination of a holder having openings in its side and bottom portions, a cylinder provided with a bottom plate resting on the bottom of said holder and having an opening at the bottom of the cylinder, the side wall of said cylinder being perforated, and a plunger movably mounted in the cylinder to act as a piston therein and provided with a handle.

In testimony whereof, I have hereunto set my hand at Los Angeles, California, this 20th day of July 1910.

NANCY M. RICHARDSON.

In presence of—
G. T. HACKLEY,
ISABEL HALL.